US008172951B2

(12) United States Patent
Massholder

(10) Patent No.: US 8,172,951 B2
(45) Date of Patent: May 8, 2012

(54) METHOD OF CLEANING WITH AN AQUEOUS COMPOSITION CONTAINING A SEMICONDUCTOR

(76) Inventor: Karl F. Massholder, Schönau b. Heidelberg (DE)

( * ) Notice: Subject to any disclaimer, the term of this patent is extended or adjusted under 35 U.S.C. 154(b) by 0 days.

(21) Appl. No.: 12/591,996

(22) Filed: Dec. 7, 2009

(65) Prior Publication Data

US 2010/0294304 A1 Nov. 25, 2010

Related U.S. Application Data

(63) Continuation of application No. 12/025,324, filed on Feb. 4, 2008, now abandoned, which is a continuation of application No. 10/451,400, filed as application No. PCT/EP01/15013 on Dec. 19, 2001, now abandoned.

(30) Foreign Application Priority Data

Dec. 21, 2000 (DE) .................................. 100 64 069

(51) Int. Cl.
*A61C 17/22* (2006.01)

(52) U.S. Cl. ................................ 134/1; 134/2; 510/253

(58) Field of Classification Search .................. 134/1, 2; 510/253

See application file for complete search history.

(56) References Cited

U.S. PATENT DOCUMENTS 5,350,644 A 9/1994 Graetzel et al.
5,564,065 A * 10/1996 Fleck et al. ................ 422/186.3
5,616,532 A * 4/1997 Heller et al. .................. 502/242
6,027,654 A 2/2000 Pappa et al.
6,037,289 A * 3/2000 Chopin et al. .................... 502/2
6,090,736 A * 7/2000 Taoda et al. ....................... 502/5
6,121,191 A * 9/2000 Komatsu et al. .............. 502/330
6,165,327 A 12/2000 Pappa et al.
6,258,736 B1 7/2001 Massholder
6,265,341 B1 * 7/2001 Komatsu et al. .............. 502/326
6,362,121 B1 * 3/2002 Chopin et al. .................... 502/2
6,365,545 B1 * 4/2002 Komatsu et al. .............. 502/326
6,383,980 B1 * 5/2002 Hagihara et al. .............. 502/340
6,407,156 B1 * 6/2002 Hagihara et al. .............. 524/494
6,468,434 B2 10/2002 Pappa et al.
6,479,141 B1 * 11/2002 Sanbayashi et al. .......... 428/323
6,524,447 B1 2/2003 Carmignani et al.
6,645,307 B2 * 11/2003 Fox et al. .......................... 134/6
6,790,409 B1 9/2004 Nakamura et al.
7,021,421 B2 * 4/2006 Ohmori et al. ................ 181/289
7,351,294 B2 * 4/2008 Murrer et al. ..................... 134/2
7,358,218 B2 * 4/2008 Muradov ...................... 510/240
7,375,069 B2 * 5/2008 Muradov ...................... 510/240
7,713,955 B2 * 5/2010 Whiteford et al. ............ 514/183
2002/0023800 A1 * 2/2002 Ohmori et al. ................ 181/294
2003/0171446 A1 * 9/2003 Murrer et al. ................... 522/16
2004/0157757 A1 * 8/2004 Massholder .................. 510/175
2004/0245496 A1 * 12/2004 Taoda ........................ 252/186.1
2006/0289035 A1 * 12/2006 Murrer et al. ..................... 134/2
2007/0202342 A1 * 8/2007 Whiteford et al. ......... 428/425.5
2008/0020127 A1 * 1/2008 Whiteford et al. ............. 427/2.1
2008/0021212 A1 * 1/2008 Whiteford et al. ............ 540/472
2008/0207581 A1 * 8/2008 Whiteford et al. ............ 514/183
2009/0007932 A1 * 1/2009 Massholder ...................... 134/1
2010/0062966 A1 * 3/2010 Lincoln et al. ................ 510/466
2010/0294304 A1 * 11/2010 Massholder ...................... 134/1
2011/0015300 A1 * 1/2011 Whiteford et al. ............ 523/122

FOREIGN PATENT DOCUMENTS

DE 693 24 574 5/1994
DE 196 54 109 A1 6/1998
FR 2 789 591 A1 8/2000
GB 2 358 638 A 8/2001
WO WO 96/23051 8/1996
WO WO 99/33564 A1 7/1999
WO WO 00/49119 8/2000
WO WO 01/46368 A2 6/2001

OTHER PUBLICATIONS

Karl F. Massholder, U.S. PTO Office Action, U.S. Appl. No. 10/451,400, Dec. 20, 2004, 6 pgs.
Karl F. Massholder, U.S. PTO Office Action, U.S. Appl. No. 10/451,400, Jul. 15, 2005, 5 pgs.
Karl F. Massholder, U.S. PTO Office Action, U.S. Appl. No. 10/451,400, Mar. 30, 2006, 11 pgs.
Karl F. Massholder, U.S. PTO Office Action, U.S. Appl. No. 10/451,400, Jan. 3, 2007, 12 pgs.
Office Action issued by the Examiner in U.S. Appl. No. 12/025,324 on Jun. 8, 2009.
Office Action issued by the Examiner in U.S. Appl. No. 12/025,324 on Apr. 30, 2009.

* cited by examiner

*Primary Examiner* — Gregory Webb
(74) *Attorney, Agent, or Firm* — Foley & Lardner LLP

(57) ABSTRACT

The use of an aqueous composition comprising a semiconductor as cleaning agent for surfaces in the outdoors field and indoors field is proposed.

11 Claims, No Drawings

METHOD OF CLEANING WITH AN AQUEOUS COMPOSITION CONTAINING A SEMICONDUCTOR

This application is a Continuation of U.S. application Ser. No. 12/025,324, filed Feb. 4, 2008 now abandoned, which is a Continuation of U.S. application Ser. No. 10/451,400, filed Sep. 10, 2003 now abandoned, which is the National Stage of International Application No. PCT/EP01/15013, filed Dec. 19, 2001, which is based upon and claims the benefit of priority from prior German Patent Application No. 100 64 069.9, filed Dec. 21, 2000, the entire contents of all of which are incorporated herein by reference.

The invention relates to the use of an aqueous composition comprising a semiconductor as a cleaning agent for surfaces.

In many areas, the unwanted biological colonization of surfaces with bacteria, yeasts, algae, mosses, lichens etc. plays an important part, which can give rise to health hazards, corrosion, danger of slipping and unsightliness.

This relates in particular to textiles, household surfaces, for example working surfaces in the kitchen, applications in the sanitation sector, building facades, floor coverings or other surfaces which are exposed to weather or organic impurities such as exhaust gases. In all of these sectors, that is to say in the indoors and outdoors sectors equally, it is desirable or even necessary to clean certain surfaces regularly or keep them low in microbes or even microbe-free.

It is known for this purpose to keep open surfaces clean by mechanical cleaning using bactericidal agents.

The disadvantage with the known cleaning processes is that infection or fouling can start again immediately after the cleaning operation. The bactericidal action depends on the care of the respective cleaning operative and the cleaning intervals. A high microbe-free or "clean" state can therefore only be maintained laboriously and with great effort. In addition, the problem is made more difficult by the fact that some bacteria or microbes develop a certain resistance toward the bactericidal agents, so that disinfection, despite careful work, does not in fact occur, or occurs only to an insufficient extent. Under some circumstances, this error is not even noticed.

Extensive disinfection measures using formaldehyde or ethylene oxide, for example at quarantine stations, represent great problems from the toxicological aspect, since these gases penetrate the material and have relatively long outgassing times. As a result, a larger supply of instruments or rooms must be kept ready, since the availability is restricted by these times.

The photo-induced disinfecting activity of semiconductor materials, in particular titanium dioxide, is known and is described, for example, in Blake D. M. et al. in Sep. Pur. Meth. 28 (1999), pages 1 to 50.

DE-A 196 54 109 discloses designing the articles to be disinfected to have a surface layer which comprises a semiconductor material and into which is coupled UV radiation from a UV radiation source. As a result, the surface layer is disinfected or acts in an oxidizing manner. However, such a solution has the disadvantage that the articles to be treated must be fixed to a surface layer which comprises a semiconductor material.

In contrast, it is an object of the invention to provide a cleaning process for surfaces which is easy to handle, makes possible individual and targeted treatment of the sites which are to be disinfected, using a cleaning agent, which, when required, can be removed again without problem and specifically.

In particular, it is an object of the invention to provide a cleaning agent having significantly improved activity compared with known cleaning agents.

According to the invention this object is achieved by using an aqueous composition comprising a semiconductor at a concentration of from 5 to 50 mg, based on 1 l of aqueous composition, as cleaning agent for surfaces, under the action of light.

Thus, according to the invention, aqueous compositions are used which comprise a semiconductor at high dilution. It has been found that, owing to the high dilution of the semiconductor, no continuous layers form on the surfaces to be treated. This leads to a type of discontinuous application of the semiconductor. It has surprisingly been found that this is essential for good activity of the photocatalyst. Although the mechanism of action has not yet been completely explained, it is assumed that owing to the fact that the semiconductor is present in particles which are isolated from one another, the electron holes and electrons formed by the photocatalytic process cannot migrate through the semiconductor and therefore are more available for reaction compared with organic substances or microorganisms. In contrast, in the case of a continuous, extended semiconductor layer, as a result of the migration of electrons and electron holes, these are no longer available for reactions. Owing to the fact that the electrons and electron holes can be distributed over broad sections in the semiconductor layer, the probability that they are available for reactions at the surface of the semiconductor is less. Consequently, a markedly poorer activity of disinfection or cleaning results. Furthermore, these processes could lead to the fact that the probability of recombination of electrons and electron holes increases. This would be the reverse of the effect which was started by the action of light, likewise with the consequence of decreased activity.

Particularly preferably an aqueous composition is used which comprises a semiconductor at a concentration of from 10 to 50 mg, based on 1 l of aqueous composition.

It is preferred in particular that the semiconductor is titanium dioxide, preferably a titanium dioxide which is at least 70% by weight in the anatase modification.

It is also possible to use the semiconductor, not in pure form, but in the form of a semiconductor doped with one or more transition metals of subgroup 8, in particular a titanium dioxide doped with platinum and/or rhodium. In this case the doped semiconductor is to contain at least 60% by weight of the semiconductor ion and less than 40% by weight of the doping ion. Those which are particularly active are doped semiconductors having a regular distribution of the doping ions in the semiconductor matrix, and are described, for example, in WO 99/33564.

The phototoxic and oxidative action of the semiconductor material in the aqueous composition is effected by light, that it to say by electromagnetic radiation, in particular of a wavelength in the range from 350 to 400 nm, preferably 380 nm, provided that undoped semiconductor material is used. Thus undoped semiconductor material can be used preferably in the outdoors field or in the indoors field with the action of artificial light. In the event that, as described above, doped semiconductors are used, the cleaning and/or disinfection action is preferably achieved using light of a wavelength in the range from 400 to 650 nm. Daylight is sufficient for this. Direct solar irradiation is not required, and diffuse light, for example in the indoors field, is also sufficient. Obviously, any artificial light source which gives off radiation in the above-mentioned wavelength range can also activate the semiconductor material. Doped semiconductor material can thus be used without restrictions in the outdoors field, just as in the indoors field, with the action of sunlight or diffuse light in the indoors field, as also under the action of artificial light in the indoors field.

Semiconductor materials are generally not water-soluble; aqueous compositions of same can be provided in the form of dispersions by physical distribution of finely divided semiconductor particles in water. Such dispersions are used according to the invention for cleaning surfaces.

In this case there are no restrictions with respect to the surfaces to be treated and the impurities to be removed: the use in the outdoors field is possible for treating buildings or paths thereof, for example facades or outdoor surrounds of buildings, such as footpath paving slabs, to combat fouling due to macroscopic organisms, such as algae, lichens, mosses or slime-forming bacteria, or in the indoors sector for cleaning and disinfecting in the hygienically relevant sectors, for example in hospitals, in food-processing enterprises, in the beverage, cosmetics or pharmaceuticals industry, in bioengineering and genetic engineering, in particular against microscopic organisms, such as bacteria, fungi, viruses or amebae.

The semiconductor material, preferably titanium dioxide, is particularly active in a mean size of the primary particles, measured by transmission electron microscopy, in the range from 10 to 2000 nm, preferably in the range from about 20 to 200 nm.

It is possible to use the aqueous composition comprising a semiconductor without further additives as cleaning agent. However, preferably, one or more of the auxiliaries listed hereinafter can be added: adhesion promoters, solubilizers, thickeners, surface-active agents and dispersants, in the amounts customary therefor.

On the auxiliaries individually:

adhesion promoters are substances which enhance the adhesion of the aqueous composition to surfaces. The semiconductor material is to remain on the surfaces to be treated for a relatively long time. Owing to the low semiconductor concentration, after the application, for example by spraying, on the surface to be treated, a continuous layer does not form. The adhesion promoter ensures that the individual isolated semiconductor particles also remain sufficiently long on the surface and thus can develop their activity. Preferred adhesion promoters are short-chain polymers, for example natural and synthetic rubbers, polyacrylates, polyesters, polychloroprenes, polyisobutenes, polyvinyl ethers or polyurethanes. These can also be used in combination with other additives, such as resins, plasticizers and/or antioxidants.

The solubilizers preferably used act so that substances dissolve in an enhanced manner in a solvent in which they are usually only slightly soluble, in the present case customarily sparingly water-soluble organic substances. Solubilizers which can serve in the present case are, for example, organic solvents which are water-miscible, such as short-chain alcohols, in particular ethanol or isopropanol.

The thickeners preferably used are to ensure that the cleaning agent, in the case of inclined or vertical surfaces, does not run off so rapidly and ensures a relatively long contact with the surface. These are organic high-molecular-weight substances which absorb liquids, swelling in the process and finally transforming into viscous true solutions or colloidal dispersions, to increase the viscosity of liquids and improve the thixotropic properties of gels.

Further auxiliaries which can be used are interface-active substances (surfactants). The surfactants generally fulfil a number of roles: firstly they improve the wetting of the surfaces to be treated. Especially in the case of structured surfaces, for example floor coverings or house facades, the cleaner can as a result penetrate better into the narrow gaps and cracks. Furthermore, owing to the action of surface-active substances, organic compounds, for example oils or fats, to which inorganic dirt particles frequently adhere, can be infiltrated and dispersed. As a result the surface-active substances support the action of titanium dioxide which breaks down the abovementioned compounds by oxidation with the result that the dirt can very readily be washed off from the surface. In addition, the surface-active substances can bring about formation of a stable foam, as a result of which the cleaner remains at the site of action for a longer period.

Further preferably usable auxiliaries are dispersants, that is to say substances which facilitate the dispersion of solid particles in a dispersion medium by lowering the surface tension between the two components, that is to say inducing wetting. Dispersants ensure that the solid constituents of the dispersion, predominantly the semiconductors, in particular titanium dioxide particles, do not sediment, but remain in suspension.

The aqueous composition comprising a semiconductor can, according to the invention, be applied simply and in a targeted manner onto the surfaces to be treated, preferably by spraying. However, it is also possible to apply the cleaning agent using a distributor, for example a brush, a sponge or a cloth.

It is completely problem-free to remove the applied cleaning agent in a targeted manner, as required, from the desired points, in the simplest manner by rinsing off with water, if appropriate using a high-pressure cleaner. The removal can be facilitated by adding a surface-active substance to the water. It is also possible to remove the cleaning agent dry.

With respect to the surface to be treated, there are in principle no restrictions, these can be equally smooth or structured, and disposed in the indoor or outdoor area. Particularly preferably, inventive buildings or parts thereof or outdoor surrounds of buildings can be treated. Further preference is given to the use for cleaning in the indoors field, in particular as kitchen or sanitary cleaner or in medicine, the pharmaceutical industry or the food industry.

For the use as a surface cleaner indoors, for example, as a kitchen or sanitary cleaner, the cleaning agent is applied and, after a certain time of action, is removed again, for example by wiping or rinsing off.

In fields where hygiene is critical, such as in medicine, the pharmaceutical industry or food industry, the time of action must conform with the predetermined reduction factors. Otherwise the use proceeds similarly to that described above for kitchen or sanitary cleaners. The disinfecting and/or cleaning action can be further enhanced by exposing the surfaces additionally to UV light.

The invention also relates to a semiconductor powder, in particular titanium dioxide, preferably titanium dioxide in the anatase modification of a mean primary particle size, measured by transmission electron microscopy, in the range from 10 to 2000 nm, preferably in the range from 20 to 200 nm, for use as claimed in one of claims 1 to 11.

Particular preference is also given to a semiconductor powder containing at least 60 mol % semiconductor ions and less than 40 mol % of one or more doping ions from subgroup 8 of the Periodic Table of the Elements, in particular of rhodium and/or platinum, for use as claimed in one of claims 4 to 11.

The invention thus has the advantage that any surfaces can be cleaned and/or disinfected by simple spraying without any fixing of the semiconductor in a layer being necessary for this. Activating the semiconductor material does not require a separate radiation source being available, daylight, even diffuse daylight, is sufficient for this. The cleaning agent acts over a relatively long period of several months, and the treatment can be repeated as often as desired after the effect has decayed. The invention makes it possible to detach inorganic impurities, since the biological adhesion promoter in the form of extra polymeric substances of the microorganisms is destroyed or removed. A further advantage is that development of resistance does not occur on the treated surfaces.

The invention will now be described in more detail with reference to an example.

The action of the inventive cleaning agent was established in the following experiments: an aqueous dispersion containing 50 mg of titanium dioxide in the anatase modification with a mean primary particle size of 21 nm (the particle size was determined by transmission electron microscopy) per liter of dispersion was applied as cleaning agent in the outdoors field to various materials such as wood, washed concrete slabs, natural rocks, plastics and masonry walls. This aqueous composition was applied to said surfaces using a spray bottle not only without further auxiliaries, but also with addition of 0.5% by weight, based on total weight of aqueous dispersion, of an acrylate polymer as adhesion promoter and 5% by weight, based on total weight of aqueous dispersion, of isopropanol as solubilizer. The surfaces were exposed only in part to the cleaning agent, so that untreated points were immediately next to treated points and as a result immediate visual assessment of the cleaning action was possible.

In the experimental variant using adhesion promoter and solubilizer, a rapid action was observed, that is to say mosses, lichens and algae died off and disappeared within a few hours. In contrast, the same action, that is to say death and disappearance of the impurities was also observed in the case of treatment with the aqueous composition without auxiliaries, but was delayed in time, that is to say only after some days. In both cases the treatment exhibited a long-term action, that is to say even after several months the beneficial patterns of observations of the treated surfaces did not change.

The invention claimed is:

1. A method of cleaning a surface, comprising applying to the surface a dispersion of an aqueous composition comprising a semiconductor at a concentration of from 5 to 50 mg, based on 1 L of aqueous composition under the action of light, wherein said applying leaves a discontinuous application of the semiconductor.

2. The method as claimed in claim 1, characterized in that the semiconductor is used at a concentration of from 10 to 50 mg, based on 1 L of aqueous composition.

3. The method as claimed in claim 1, characterized in that the semiconductor is titanium dioxide, preferably a titanium dioxide which is at least 70% by weight in the anatase modification.

4. The method as claimed in claim 1, characterized by the use of a doped semiconductor which contains at least 60 mol % semiconductor ions and less than 40 mol % of one or more doping ions from subgroup 8 of the Periodic Table of the Elements.

5. The method as claimed in claim 4, characterized in that a titanium dioxide semiconductor doped with rhodium and/or platinum ions is used.

6. The method as claimed in claim 1 under the action of light of a wavelength in the range from 350 to 400 nm, preferably 380 nm, in the outdoors field, or in the indoors field under the action of artificial light.

7. The method as claimed in claim 4 under the action of light of a wavelength in the range from 400 to 650 nm.

8. The method as claimed in claim 1, characterized in that the semiconductor has a mean primary particle size, measured by transmission electron microscopy, in the range from 10 to 2000 nm, preferably in the range from 20 to 200 nm.

9. The method as claimed in claim 1, characterized in that the aqueous composition contains one or more of the following auxiliaries: adhesion promoters, solubilizers, surface-active substances, dispersants and/or thickeners.

10. The method as claimed in claim 1, characterized in that the aqueous semiconductor-containing composition is applied to the surfaces to be cleaned by spraying or by means of a distributor, in particular by means of a brush, a sponge or a cloth.

11. The method as claimed in claim 1 for cleaning buildings or parts thereof or outdoor surrounds of buildings or for cleaning in the indoors field, in particular as kitchen or sanitary cleaner or in medicine, the pharmaceutical industry or the food industry.

* * * * *